Figure 1:
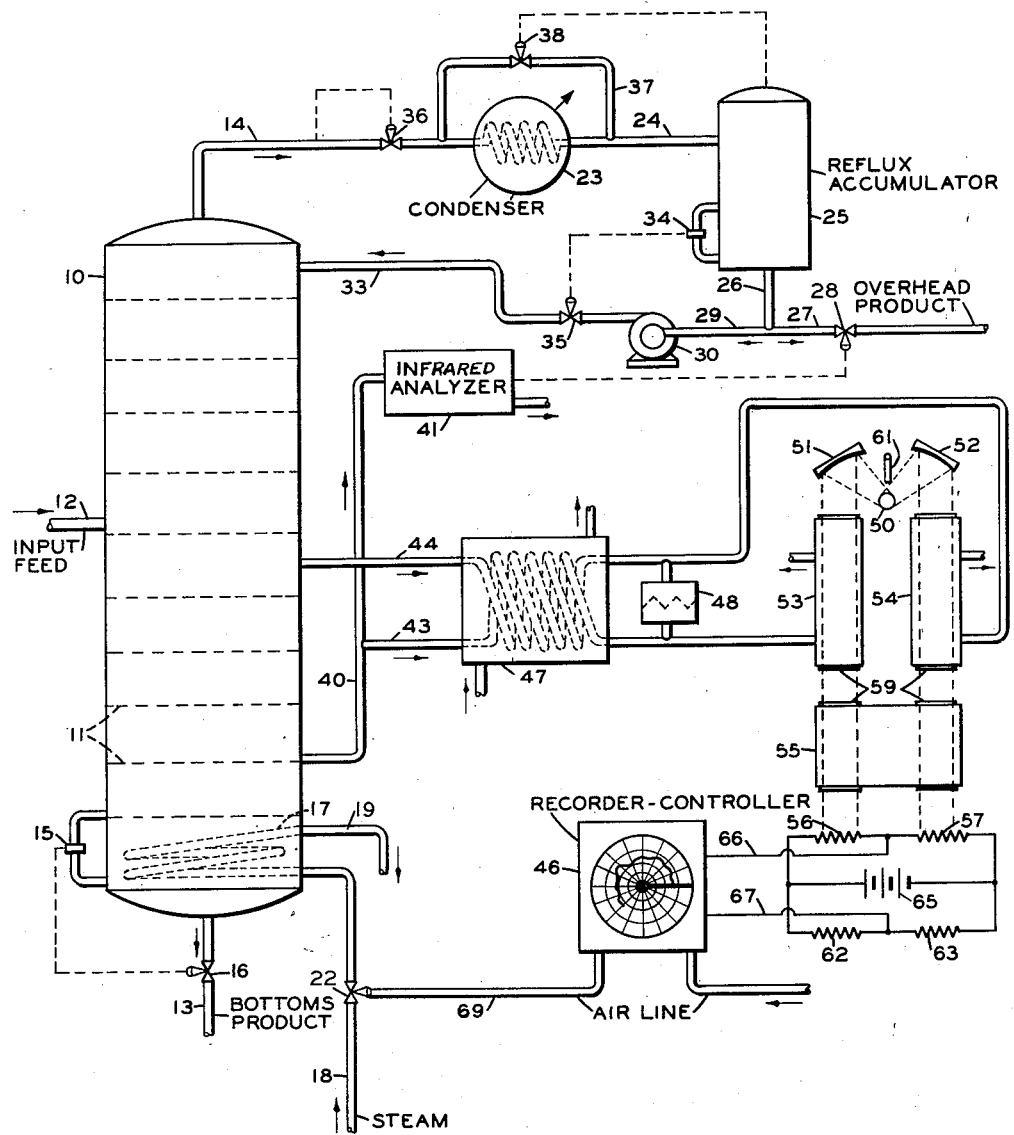

Sept. 25, 1956     J. W. HUTCHINS     2,764,536
DIFFERENTIAL ANALYZER AND CONTROL SYSTEM
Filed Sept. 17, 1951     2 Sheets-Sheet 1

INVENTOR.
J. W. HUTCHINS

BY Hudson & Young

ATTORNEYS

Sept. 25, 1956  J. W. HUTCHINS  2,764,536
DIFFERENTIAL ANALYZER AND CONTROL SYSTEM
Filed Sept. 17, 1951  2 Sheets-Sheet 2

INVENTOR.
J. W. HUTCHINS
BY Hudson & Young
ATTORNEYS

United States Patent Office 2,764,536
Patented Sept. 25, 1956

2,764,536

DIFFERENTIAL ANALYZER AND CONTROL SYSTEM

Joseph W. Hutchins, Bartlesville, Okla., assignor to Phillips Petroleum Company, a corporation of Delaware Application September 17, 1951, Serial No. 247,009

7 Claims. (Cl. 202—206)

This invention relates to a method and apparatus for continuously analyzing and/or controlling processes involving the separation of fluid mixtures into their various components. In another aspect it relates to a method for controlling separating columns by means of maintaining preselected concentration differentials between various points in the column. In another aspect it relates to apparatus for continuously measuring the concentration differential of a component present in two separate samples of a mixture under analysis. In still another aspect it relates to means for controlling the separation of normal butane from butene-1 in the presence of butadiene and other $C_4$ hydrocarbons.

As is well known to those familiar with refining operation, fractionation is a term used to designate processes wherein two or more substances of different volatility are separated by some combination of evaporating, condensing, and vapor-liquid contacting steps. The ordinary fractionating column includes a tower having a plurality of spaced bubble trays or the like on which the vapors and liquid make contact with one another. The feed mixture usually is supplied at some intermediate point in the tower and heat is supplied to the bottom to provide for evaporation of the material being separated. The vapor is ultimately condensed at the top of the column, with a portion of the condensate being removed as the overhead product and the remainder returned to the column as reflux in order to increase the degree of separation obtained. The less volatile substance is removed from the bottom of the tower as the bottoms product. Thus the transfer of a quantity of heat upward through the column results in a certain net transfer of material, and the separation obtained between the overhead and bottoms products is a function of the number of contacting steps employed and the reflux ratio. For steady state operation both heat and material transfer must be in balance; and it is toward maintaining such a condition that the various control instruments and systems known in the art have been provided.

In recent years the petroleum and chemical industries have been faced with the problem of developing more accurate and reliable control instruments for use on fractionating columns, which instruments can keep pace with the increasing use of superfractionation on large scale equipment for the separation of components in a high degree of purity. It has become quite apparent that the former standard methods of control which include flow rate, temperature, pressure, and liquid level, when employed alone, are no longer adequate to bring about the precise composition control desired in modern operations. The present trend, therefore, is toward increased usage of the more complex automatic analyzers and control devices which serve to provide rapid and precise control of product purity through adjustment of an appropriate process variable in response to variations of one or more normal operating conditions. Such analyzers include, for example, infrared and ultraviolet spectrometers, refractometers, and mass spectrometers.

One instrument that has proved particularly valuable in this regard is the infrared spectophotometer. As is well known, heteratomic molecules, i. e., molecules containing more than one kind of element have the property at room temperature or thereabout of absorbing light energy from the infrared spectrum at only certain wave lengths to produce spectra having bands which characterize the molecule under consideration. Thus, a relatively simple analysis instrument can be provided by directing two beams of infrared radiation from a given source through respective sample cells to strike suitable radiation detectors such as bolometers, thermistors, thermocouples, or the like. By placing a pure sample of the material whose presence is being determined in one sample cell and the unknown material in the second sample cell, the radiation reaching the respective detectors therefore indicates directly the concentration of the component under consideration provided the temperature and pressure of the two samples are equalized. However, since most samples being analyzed usually consist of a mixture of heteratomic compounds, means must be provided for filtering out the undesired absorption wave lengths. For example, if a mixture containing heteratomic components A, B, and C is to be analyzed to determine the presence of C; filters are provided in each path to absorb those infrared wave lengths characteristic of the absorption bands of A and B, so that the radiation of these last-mentioned wave lengths is completely removed from the resulting beams. A simple method of providing such filters is to insert cells containing pure samples of components A and B in each radiation path. In this manner variation in intensity of the radiation beams impinging upon the respective detectors is representative only of differences in concentration of component C in the standard and sample cells.

In separation processes the two components present in the feed stream in considerable concentration and which appear primarily in respective terminal streams of the column are referred to as the key components; these components generally are those employed for control purposes, although in some situations an intermediate key component can effectively be so employed. In the past, column control by infrared analysis generally has taken the form of withdrawing a sample stream from a preselected location in the column and analyzing said sample to determine the concentration of the particular key component under consideration. In response to this analysis, one or more of the process variables, e. g. input feed rate, reflux ratio, product withdrawal, or heat supplied, are adjusted in order to maintain the concentration of the key component at the desired value.

The present invention, however, provides for an improved method of such column control which makes use of a novel differential type double beam infrared analyzer. Sample streams from two spaced preselected points in the column are circulated through respective sample cells of the analyzer to obtain a measurement of the difference in concentration of a key component between the two sample points. As is well known in the various fields of physical measurement, differences between two quantities generally can be measured with considerably more accuracy than the absolute determination of either quantity alone. Also by measuring the difference in concentration of a key component between two spaced points a closer degree of control is made possible than by attempting to regulate the column from a single concentration point.

Accordingly, it is an object of this invention to provide an improved method for controlling separating columns.

Another object is to provide apparatus for determining differences in concentration between two samples of a selected material.

A further object is to provide an improved method for controlling the separation of fluid mixtures into their various components.

A still further object is to provide a control system for the separation of normal butane from butene-1 in the presence of butadiene and other C₄ hydrocarbons.

Still another object is to provide simplified apparatus which is capable of giving reliable results in carrying out the above-mentioned objects.

Figure 2:
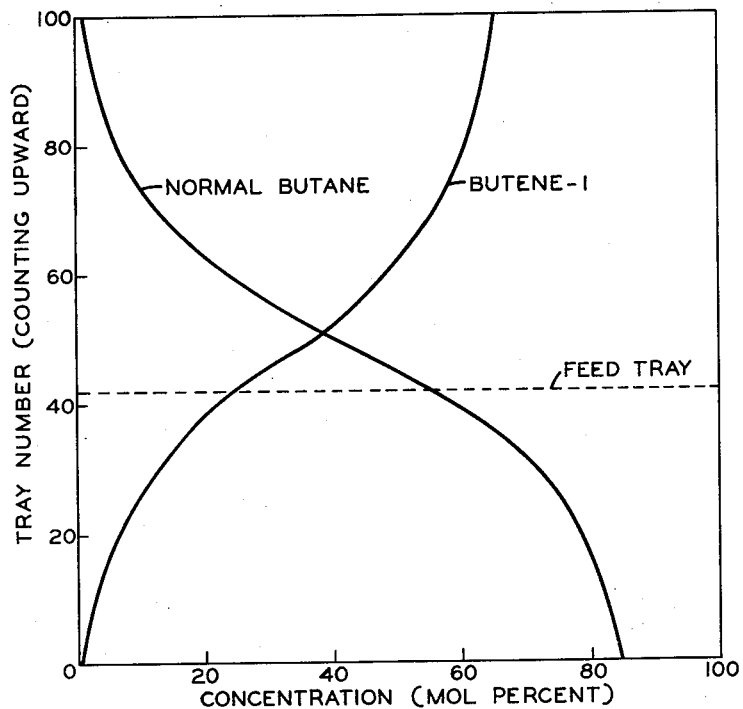

Various other objects, advantages and features of this invention should become apparent to those skilled in the art from the following detailed description taken in conjunction with the accompanying drawings illustrating a preferred embodiment thereof in which:

Figure 1 is a schematic view of a separating column together with analysis and control apparatus associated therewith; and Figure 2 illustrates concentration curves of the components being separated.

Referring now to the drawings in detail and to Figure 1 in particular, there is shown a fractionating column 10 of any suitable design employing contacting means such as perforated plates, bubble decks, or the like designated at 11. The feed mixture to be fractionated is supplied through inlet conduit 12 at a rate which can be controlled by a conventional rate of flow controller, not shown, to an intermediate point in column 10, and is separated therein into a liquid bottoms fraction which is withdrawn through conduit 13 and a lower boiling overhead vaporous or gaseous stream which is withdrawn through conduit 14.

The rate of withdrawal of the bottoms product through conduit 13 is regulated by means of a conventional liquid level flow-controller 15 which in turn actuates adjustable valve 16 in conduit 13. A heating coil 17 is positioned within the bottom portion of column 10 in order to reboil the bottoms fraction so as to substantially free the same of undesired light components. A heating medium such as steam enters coil 17 by means of conduit 18 and leaves coil 17 through conduit 19. The rate of steam flow through coil 17 is regulated by an adjustable valve 22 in conduit 18 in a manner which is more fully described hereinafter.

The vapors and/or gases comprising the relatively light components of the feed mixture supplied to fractionating column 10, which are not retained in the heavier reboiled bottoms fraction, are directed from the upper portion of the fractionator through conduit 14 to condenser 23 wherein they are partially or completely condensed, as desired, and wherefrom resulting condensate, together with any uncondensed components, is directed through conduit 24 to reflux accumulator 25. A regulated quantity of distillate collected in accumulator 25 is discharged therefrom through conduits 26 and 27. Adjustable valve 28 in conduit 27 controls this overhead output product flow in a manner which is more fully described hereinafter. In order to provide refluxing liquid for the column, a regulated quantity of distillate collected in accumulator 25 is directed therefrom through conduits 26 and 29 to a pump 30, from which the refluxing liquid is forced through conduit 33 to the upper portion of column 10. The refluxing liquid is returned to the column at a fixed rate determined by the setting of a liquid level flow-control instrument 34 which actuates an adjustable valve 35 in conduit 33 in accordance with the liquid level of distillate in accumulator 25. In order to maintain the desired operating pressure on column 10 an automatic pressure control valve 36 is disposed in conduit 14 between column 10 and condenser 23. Conduit 37, having pressure controlled valve 38 actuated by the pressure in accumulator 25, serves to by-pass 23 to compensate for the pressure drop due to lower vapor pressure of the cool condensate.

In order to explain the construction and operation of the control system of this invention as used in conjunction with a conventional fractionating column such as described above, reference will be made to a particular separation of normal butane from butene-1 in the presence of butadiene and other C₄ hydrocarbons which include: butadiene, butene-2 (cis), butene-2 (trans), isobutane, and isobutene. Column 10 contains 100 trays and the feed stream enters at approximately the 42nd tray from the bottom of the column. A particular degree of separation that has been found desirable is one in which the overhead product contains approximately 61 percent butene-1 together with approximately 1.3 percent normal butane, while the bottoms product contains approximately 83 percent normal butane together with approximately 0.7 percent butene-1. In Figure 2 there is illustrated the concentrations of these two key components at the various trays in the column; for purpose of simplicity the remaining five C₄ hydrocarbons present in the feed stream have been omitted from the concentration graph.

In the preferred control process herein described butene-1 is selected as the key component for purposes of analysis. A sample vapor stream is removed from approximately the 10th tray from the bottom of the column through conduit 40 to an infrared analyzer-controller unit 41 which serves to regulate the rate of overhead product withdrawal from column 10 by adjustment of valve 28 in conduit 27. Unit 41 measures the concentration of butene-1 present in the sample stream, and in response to variations thereof serves to regulate the overhead product withdrawal rate in a manner such as to maintain the concentration of butene-1 at the 10th tray constant at approximately 2.5 percent. For example, if the concentration of butene-1 tends to increase at the 10th tray valve 28 is opened slightly, while if said concentration tends to decrease valve 28 is closed slightly. An analyzer of the type described in my copending application Serial No. 103,158, filed July 5, 1949, now U. S. Patent No. 2,579,825 entitled Analyzer, preferably can be employed as unit 41 to determine the concentration of butene-1. An output voltage from said analyzer 41 operates valve 28 by means well known to those skilled in the art, such as for example, through an air or solenoid operated control valve.

A second sample vapor stream also is removed from tray 10 through conduit 43, which is branched off conduit 40. This second stream, together with a third sample vapor stream removed from column 10 through conduit 44 at approximately tray 40, is applied to the differential infrared analyzer of the present invention, which in turn actuates recorder-controller 46 to regulate the steam input to the bottom of column 10 through valve 22.

Conduits 43 and 44 which carry the two sample streams pass through a common heat exchange unit 47 and are intercoupled by means of a pressure equalizing unit 48 in order for the two streams to enter the infrared analyzer at equal temperature and pressure. The analyzer itself includes a source of infrared radiation 50 which can be any well known emitter such as a heated coil of Nichrome wire. Portions of this radiation strike concave reflectors 51 and 52; from which the reflected beams are directed through cells 53 and 54, respectively; through a common filter cell 55; and finally to radiation detectors 56 and 57, respectively. Cells 53, 54, and 55 are provided with windows such as 59 which are transparent to the radiation under consideration. For infrared radiation windows 59 can be formed of a halide such as silver chloride, calcium fluoride, and sodium fluoride, or quartz. Between source 50 and reflectors 51 and 52 there is inserted a trimmer 61 which consists of a small opaque disk which selectively can be inserted in either radiation beam as may be required to balance the detecting circuit. Detectors 56 and 57 can be any suitable type of radiation-sensitive elements, such as bolometers, thermistors, or thermocouples. As illustrated, detectors 56 and 57 comprise bolometric resistors forming adjacent arms of a Wheatstone bridge circuit which further includes balancing resistors 62 and 63, and a source of voltage 65 applied across opposite corners of said bridge. Output leads 66 and 67 taken across the second pair of opposite corners of said bridge are applied to a recorder-control unit 46 which in turn actuates valve 22 by means of a regulated air line 69. Unit 46, for example, can be any well known electro-pneumatic recording and control device which transmits electrical input signals into representative variations in air flow through control conduit 69. This air flow operates valve 22 which regulates the steam input to column 10. The Brown Air-O-Line recorder is an instrument which can be so employed.

In operation of this control circuit the two samples from trays 10 and 40 are circulated through cells 53 and 54, respectively. From cells 53 and 54 the samples can be vented to a waste pipe or returned to the fractionating column through a common conduit, not shown. Common filter cell 55 is filled with materials capable of absorbing radiation corresponding to the characteristic absorption bands of the various components present in the sample streams besides butene-1, that is the other six $C_4$ hydrocarbons present in the feed stream to the fractionating column. A particular filtering arrangement which effectively can be employed is to fill cell 55 with sufficient quantities of the six $C_4$ hydrocarbons so as to selectively absorb all their characteristic wave lengths. By the use of such a filter differences in intensity of radiation impinging upon detectors 56 and 57 are due entirely to differences in concentration of butene-1 present in the two sample cells as indicated by the relative absorption of the wave lengths corresponding to the characteristic absorption bands of butene-1. Differences in radiation striking detectors 56 and 57 vary the resistances thereof to create an unbalanced condition in the bridge circuit, which is transmitted to recorder-controller 46. As indicated in Figure 2 the desired concentration of butene-1 at tray 40 is approximately 21 per cent and at tray 10, 2.5 per cent. The bridge circuit and associated controller are adjusted to pass a preselected quantity of steam into column 10 as necessary to maintain this desired concentration differential. The intensity of radiation traversing cells 53 and 54 also can be adjusted initially by means of trimmer 61 in order to aid in establishing the reference balanced condition. Any deviation that takes place in the concentration differential thereby creates an unbalance of the bridge circuit which in turn adjusts steam valve 22 through controller 46. For example, if the concentration differential should increase less steam should be supplied to the column while if the concentration differential should decrease more steam should be supplied to the column. Since analyzer-controller 41 is operating to maintain the concentration of butene-1 constant at the 10th tray, differences in concentration clearly indicate deviation in concentration of the butene-1 at the 40th tray from the desired valve.

From the foregoing description it should be apparent that the control system herein described operates to maintain an accurate concentration differential of one of the key components within the fractionating column. Although this invention has been described in conjunction with a present preferred embodiment thereof it should be apparent that numerous modifications can be made without departing from the scope thereof.

The principles of this invention are applicable to various separation systems in which a concentration differential is found within the separation chamber, such as for example, solvent extraction columns in which one of the components is selectively absorbed by a solvent flowing through the column, or in distillation columns. The particular method of controlling the column in response to concentration variations also can be modified in several ways. Almost any combination of the numerous process variables such as feed rate, temperature, and composition, reflux ratio, product withdrawal rate, column pressure, and column heat input; can be adjusted to give the desired degree of control. While the basic reference point concentration can effectively be controlled by an infrared analyzer various other means such as an ultraviolet analyzer could be used for this purpose. It is possible in certain separation processes to avoid the use of the basic point control since the differential reading alone is sufficient. This type of process is one in which the slope of the key component concentration curve is of such degree that a difference in concentration differential reading is indicative of a concentration shift in only one direction.

In determining the sample points for analysis care should be taken to select a portion of the concentration curve in which a differential reading is not ambiguous. Both sample points usually should be either above or below the feed tray. Another desirable condition is to have the sample points near the process control variable responsive thereto in order to avoid correction time lags within the column. Normally a greater concentration differential is realized by selecting sampling points as far apart as possible thereby increasing the accuracy of the instrument reading.

The various features of the analysis instrument itself and associated control mechanism further can be modified in a number of ways within the scope of this invention. For example, any of several known electrical detecting circuits can be employed in place of the illustrated Wheatstone bridge. One particular circuit which can be so employed is described in my aforementioned copending application. The output of the detecting circuit can be applied directly to the control of column steam input through the use of a solenoid or motor driven valve in place of pneumatic valve 28. It further should be apparent that the means employed to detect the differences in concentration at the two sample points are not necessarily restricted to infrared analyzers since other known methods of analysis, such as those employing ultraviolet radiation can be used equally well.

I claim:

1. A control system for a column adapted to separate a fluid mixture into a plurality of product streams which comprises, in combination, first conduit means communicating with a first region in the column to withdraw a first sample stream, an analyzer to measure the concentration of one of the components present in said first sample stream, means responsive to the output of said analyzer to adjust the operation of the column to maintain the concentration of said one component constant at said first region, second conduit means communicating with the column at a second region spaced from said first region to withdraw a second sample stream, a second analyzer adapted to measure differences in concentration of a component of the fluid mixture in said first and second sample streams, and means responsive to said second analyzer to adjust the operation of the column to maintain a constant difference between the concentration of the component detected by said second analyzer in said first and second sample streams.

2. The combination in accordance with claim 1 wherein said second analyzer comprises first and second sample cells through which said first and second sample streams are circulated, respectively, a source of radiation, means for directing first and second beams of radiation from said source through said first and second cells, respectively, filter means positioned in said radiation beams to absorb wave lengths of radiation corresponding to the characteristic absorption bands of components present in the samples being tested other than the component being measured, and means to measure the transmitted radiation of said beams.

3. In a fractionation column including a conduit to pass a fluid mixture to be separated into said column, conduit means to withdraw an overhead product from said column, conduit means to withdraw a bottoms product from said column, and means to heat the lower portion of said column; a control system comprising, in combination, conduit means to withdraw a first sample of the mixture being separated from a first region in said column, an analyzer to measure the concentration of one of the components present in said first sample, control means actuated by the output signal of said analyzer to adjust the overhead product withdrawal rate to maintain the concentration of said component at a preselected value at said first region, conduit means to withdraw a second sample of the mixture being separated from a second region in said column spaced from said first region, a second analyzer to measure the differential concentration of said component in said first and second sample streams, and control means responsive to the output signal from said second analyzer to adjust the heat supplied to said column to maintain said concentration differential at a constant value.

4. In a fractionation column including conduit means to pass a fluid mixture to be separated into said column, means to withdraw an overhead product from said column, means to withdraw a bottoms product from said column, and means to heat the lower portion of said column; a control system comprising, in combination, conduit means to withdraw a first sample stream of the mixture being separated from a first region in said column, an analyzer to measure the concentration of one of the components present in said first sample stream, control means responsive to the output signal from said analyzer to adjust the overhead product withdrawal rate to maintain the concentration of said component at a preselected value at said first region, conduit means to withdraw a second sample stream of the mixture being separated from a second region in said column, means to equalize the temperatures and pressures of said first and second sample streams, first and second sample cells, means to direct said first sample stream through said first sample cell, means to direct said second sample stream through said second sample cell, a source of radiation, means to direct first and second beams of radiation from said source through said first and second cells, respectively, filter means positioned in said beams to absorb wave lengths of radiation corresponding to the characteristic absorption bands of the components present in said sample streams other than said one component being analyzed, radiation detecting elements positioned in the respective paths of the transmitted beams of radiation, and means responsive to differences in radiation measured by said first and second elements to adjust the heat supplied to said column to maintain a constant difference between the concentration of said component at said first and second regions.

5. In a fractionation column including conduit means to pass a fluid mixture to be separated into said column, said mixture comprising normal butane, butene-1 and other hydrocarbons having four carbon atoms per molecule, means to withdraw an overhead product from said column, means to withdraw a bottoms product from said column, and means to heat the lower portion of said column; a control system comprising, in combination, conduit means to withdraw a first sample stream of the mixture being separated from a first region in said column, an analyzer to measure the concentration of butene-1 in said first sample stream, control means responsive to the output signal from said analyzer to adjust the overhead product withdrawal rate to maintain the concentration of butene-1 at a preselected value at said first region, conduit means to withdraw a second sample stream of the mixture being separated from a second region in said column, means to equalize the temperatures and pressures of said first and second sample streams, first and second sample cells, means to direct said first sample stream through said first sample cell, means to direct said second sample stream through said second sample cell, a source of infrared radiation, means to direct first and second beams of radiation from said source through said first and second cells, respectively, filter means positioned in said beams to absorb wave lengths of radiation corresponding to the characteristic absorption bands of the components present in said sample streams other than butene-1, radiation detecting elements positioned in the respective paths of the transmitted beams of radiation, and means responsive to differences in radiation measured by said first and second elements to adjust the heat supplied to said column to maintain a constant difference between the concentration of butene-1 at said first and second regions.

6. An analyzer comprising, in combination, first and second sample cells each having inlet and outlet openings therein, a first conduit connected to the inlet opening of said first cell, a second conduit connected to the inlet opening of said second cell, means connecting a portion of said first and second conduits in heat exchange relationship, means connecting the interiors of said first and second conduits in pressure equalizing relationship, a source of radiation, means to direct a first beam of radiation from said source through said first cell, means to direct a second beam of radiation from said source through said second cell, and means to measure the transmitted radiation of said first and second beams.

7. The combination in accordance with claim 6 further comprising filter means disposed in both of said beams of radiation.

References Cited in the file of this patent
UNITED STATES PATENTS

| | | |
|---|---|---|
| 2,297,098 | Carney | Sept. 29, 1942 |
| 2,386,601 | Fisher | Oct. 9, 1945 |
| 2,386,778 | Claffey | Oct. 16, 1945 |
| 2,386,830 | Wright | Oct. 16, 1945 |
| 2,386,831 | Wright | Oct. 16, 1945 |
| 2,459,404 | Anderson | Jan. 18, 1949 |
| 2,529,030 | Latchum | Nov. 7, 1950 |
| 2,580,651 | Boyd | Jan. 1, 1951 |

OTHER REFERENCES

Perry, Chemical Engineers' Handbook, Third Edition, 1950, McGraw-Hill, New York, pages 1304–1306.